United States Patent
Kim et al.

(10) Patent No.: US 9,357,549 B2
(45) Date of Patent: May 31, 2016

(54) METHOD FOR TRANSMITTING AN UPLINK SIGNAL IN A WIRELESS COMMUNICATION SYSTEM, AND APPARATUS FOR SAME

(71) Applicant: LG Electronics Inc., Seoul (KR)

(72) Inventors: Min Gyu Kim, Anyang-si (KR); Dong Youn Seo, Anyang-si (KR); Han Byul Seo, Anyang-si (KR); Joon Kui Ahn, Anyang-si (KR); Suck Chel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/829,092

(22) Filed: Aug. 18, 2015

(65) Prior Publication Data

US 2015/0365949 A1    Dec. 17, 2015

Related U.S. Application Data

(63) Continuation of application No. 14/521,205, filed on Oct. 22, 2014, now Pat. No. 9,130,717, which is a continuation of application No. 13/577,830, filed as application No. PCT/KR2011/000070 on Jan. 6, 2011, now Pat. No. 8,885,589.

(60) Provisional application No. 61/302,940, filed on Feb. 9, 2010.

(51) Int. Cl.
*H04W 72/04* (2009.01)
*H04L 5/00* (2006.01)
(Continued)

(52) U.S. Cl.
CPC ............ *H04W 72/0453* (2013.01); *H04L 5/001* (2013.01); *H04L 5/0048* (2013.01);
(Continued)

(58) Field of Classification Search
CPC .................... H04W 72/0453; H04W 72/0406;
H04W 72/0413; H04W 72/042; H04W 88/08;
H04W 28/26; H04W 5/001; H04L 5/001;
H04L 5/0048; H04L 5/0091
USPC ........................................................ 370/329
See application file for complete search history.

(56) References Cited

U.S. PATENT DOCUMENTS 7,054,296 B1   5/2006   Sorrells et al.
8,885,589 B2   11/2014   Kim et al.
(Continued)

FOREIGN PATENT DOCUMENTS

KR   10-2007-0119958 A   12/2007
KR   10-2008-0029734 A   4/2008
(Continued)

*Primary Examiner* — Omar Ghowrwal
*Assistant Examiner* — Ellen A Kirillova
(74) *Attorney, Agent, or Firm* — Birch, Stewart, Kolasch & Birch, LLP

(57) ABSTRACT

A method of transmitting a sounding reference signal (SRS) by a user equipment in a wireless communication system, a non-transitory computer readable medium on which a program for executing the method is recorded, and a user equipment for performing the method are discussed. The method according to one embodiment includes receiving a physical downlink control channel (PDCCH) including a carrier indicator field (CIF) and an SRS field via a first component carrier (CC) among a plurality of CCs including the first CC and one or more second CCs, the CIF indicating a specific CC and the SRS field indicating whether the user equipment has to transmit the SRS; transmitting the SRS on an uplink subframe; and receiving a first medium access control (MAC) information. If a bit for the specific CC in a bitmap has been disabled, the specific CC and SRS transmission on the specific CC are deactivated.

17 Claims, 14 Drawing Sheets

(51) Int. Cl.
 *H04W 28/26* (2009.01)
 *H04W 88/08* (2009.01)
(52) U.S. Cl.
 CPC ............. *H04L5/0091* (2013.01); *H04W 28/26* (2013.01); *H04W 72/042* (2013.01); *H04W 72/0406* (2013.01); *H04W 72/0413* (2013.01); *H04W 88/08* (2013.01)

(56) References Cited

U.S. PATENT DOCUMENTS

| | | | |
|---|---|---|---|
| 2006/0093147 A1 | 5/2006 | Kwon et al. | |
| 2008/0095252 A1 | 4/2008 | Kim et al. | |
| 2008/0102846 A1 | 5/2008 | Kim et al. | |
| 2008/0310483 A1 | 12/2008 | Lee et al. | |
| 2009/0042616 A1* | 2/2009 | Teo | H04B 7/0691 455/562.1 |
| 2009/0046808 A1 | 2/2009 | Varadarajan et al. | |
| 2009/0131069 A1 | 5/2009 | Wu et al. | |
| 2010/0061330 A1 | 3/2010 | Hanov | |
| 2010/0195566 A1 | 8/2010 | Krishnamurthy et al. | |
| 2010/0208672 A1 | 8/2010 | Chun et al. | |
| 2010/0322158 A1* | 12/2010 | Lee | H04L 5/001 370/329 |

FOREIGN PATENT DOCUMENTS

| | | |
|---|---|---|
| KR | 10-2008-0085657 A | 9/2008 |
| KR | 10-2009-0034051 A | 4/2009 |

* cited by examiner (a) Control-plane protocol stack (b) User-plane protocol stack

FIG. 10

| UE1 TPC (2 bit) | UE2 TPC (2 bit) | UE3 TPC (2 bit) | UE4 TPC (2 bit) | UE5 TPC (2 bit) | UE6 TPC (2 bit) | UE7 TPC (2 bit) | UE8 TPC (2 bit) | UE9 TPC (2 bit) | UE10 TPC (2 bit) | ZP |

Format 3

| TPC | TPC | TPC | TPC | TPC | TPC | TPC | TPC | TPC | TPC | TPC | TPC | TPC | TPC | TPC | TPC | TPC | TPC | TPC | TPC | TPC |

Format 3A

METHOD FOR TRANSMITTING AN UPLINK SIGNAL IN A WIRELESS COMMUNICATION SYSTEM, AND APPARATUS FOR SAME

CROSS-REFERENCE TO RELATED APPLICATIONS

This application is a Continuation of U.S. application Ser. No. 14/521,205 filed on Oct. 22, 2014, which is a continuation of U.S. application Ser. No. 13/577,830 filed on Aug. 8, 2012, now U.S. Pat. No. 8,885,589, which is the National Phase of PCT/KR2011/000070 filed on Jan. 6, 2011, which claims the benefit under 35 U.S.C. §119(e) to U.S. Provisional Application No. 61/302,940, filed on Feb. 9, 2010. The contents of all of these applications are hereby incorporated by reference as fully set forth herein in their entirety.

BACKGROUND OF INVENTION

1. Field of the Invention

The present invention relates to a wireless communication system, and more particularly, to a method and apparatus for transmitting an uplink signal in a wireless communication system.

2. Discussion of the Background Art

As an example of a mobile communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-LIMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz. The system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

SUMMARY OF THE INVENTION

An object of the present invention is to provide a method and apparatus for transmitting an uplink signal in a wireless communication system.

The technical problems solved by the present invention are not limited to the above technical problems and other technical problems which are not described herein will become apparent to those skilled in the art from the following description.

The object of the present invention can be achieved by providing a method of transmitting an uplink data signal by a user equipment in a wireless communication system including receiving control information for transmitting the uplink data signal in a specific subframe from a base station, allocating resources for the uplink data signal according to the control information, and transmitting the uplink data signal using the allocated resources, wherein the control information includes resource extension information indicating whether a last symbol of the specific subframe is allocated as resources for transmitting the uplink data.

In another aspect of the present invention, there is provided a user equipment (UE) of a wireless communication system including a reception module configured to receive control information for transmitting an uplink data signal in a specific subframe from a base station, a processor configured to allocate resources for the uplink data signal according to the control information, and a transmission module configured to transmit the uplink data signal using the allocated resources, wherein the control information includes resource extension information indicating whether a last symbol of the specific subframe is allocated as resources for transmitting the uplink data The control information may include resource extension information for allocating the last symbol of the specific subframe as the resources for transmitting the uplink data if a frequency band for transmitting the uplink data signal at the UE in the specific subframe does not overlap a bandwidth for transmitting a sounding reference signal of other UE.

The control information may be received via a physical downlink control channel (PDCCH) or a physical downlink shared channel (PDSCH), the resource extension information may be 1-bit information included in the control information, and the resource extension information may be expressed by a scrambling sequence applied to the control information.

The sounding reference signal of the other UE may be an aperiodic sounding reference signal.

According to the embodiments of the present invention, it is possible to efficiently transmit an uplink signal at a user equipment (UE) in a wireless communication system.

The effects of the present invention are not limited to the above-described effects and other effects which are not described herein will become apparent to those skilled in the art from the following description.

BRIEF DESCRIPTION OF DRAWINGS

FIG. 10 is a diagram showing the structure of DCI formats 3 and 3A in an LTE system.

DETAILED DESCRIPTION OF THE INVENTION

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

In the present specification, a 3G-PP LTE (Release-8) system is referred to as an LTE system or a legacy system. A UE supporting an LTE system is referred to as an LTE UE or a legacy UE. A 3GPP LTE-A (Release-9) system is referred to as an LTE-A system or an advanced system. A UE supporting an LTE-A system is referred to an LTE-A UE or an advanced UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
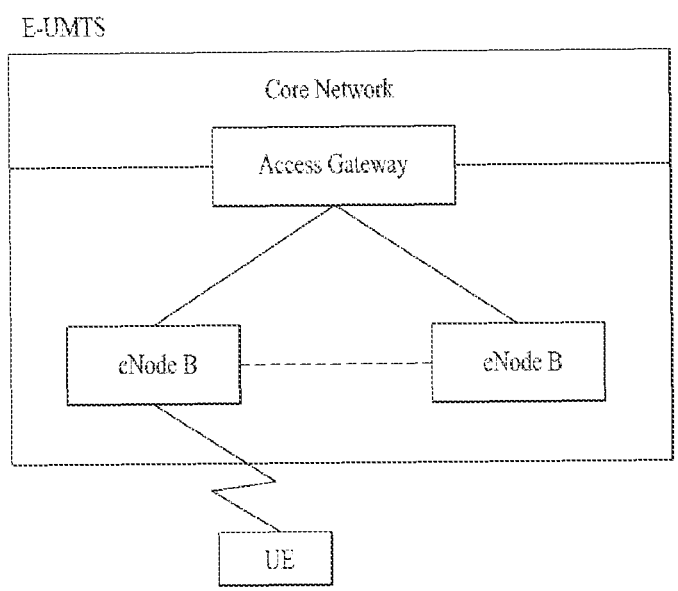
FIG. 1 is a diagram showing a network structure of an Evolved Universal Mobile Telecommunications System (E-UMTS) as an example of a wireless communication system.
Figure 2:
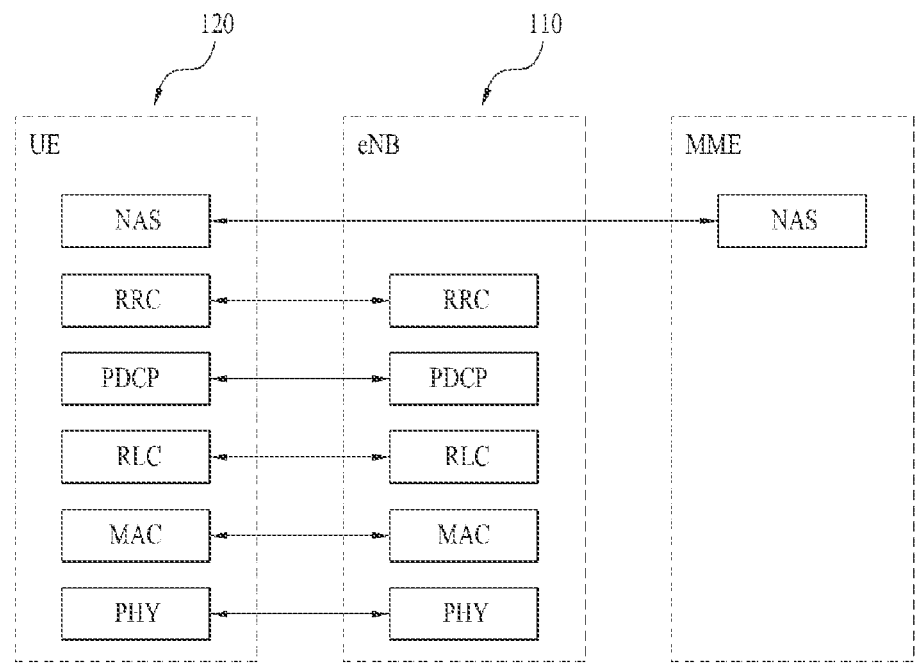
FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.
Figure 2:
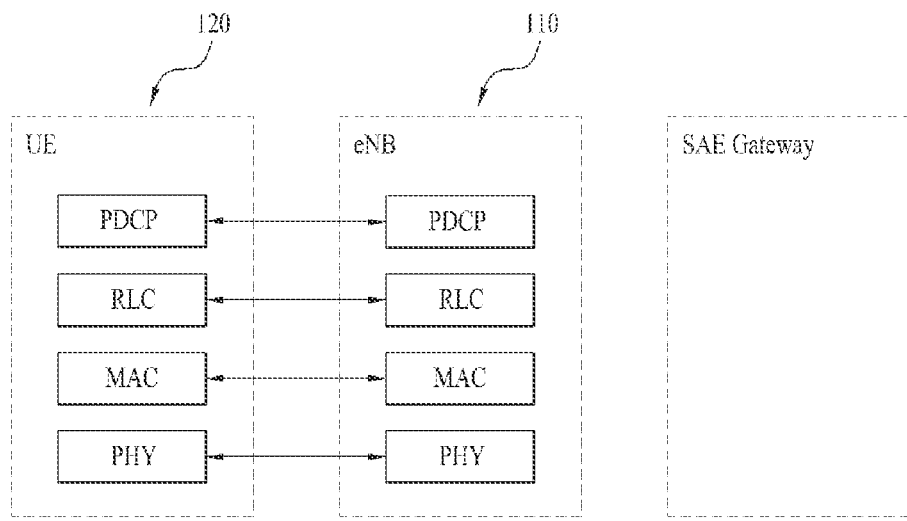

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to several UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
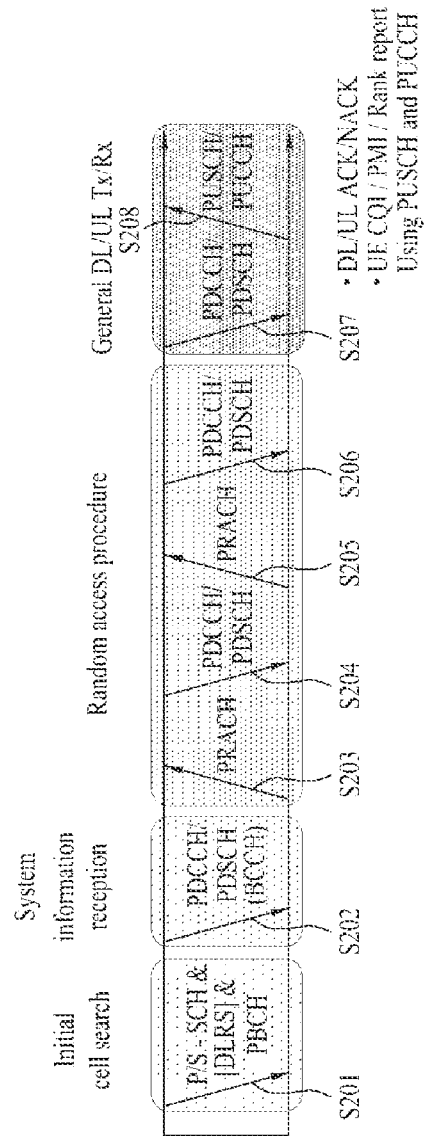
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
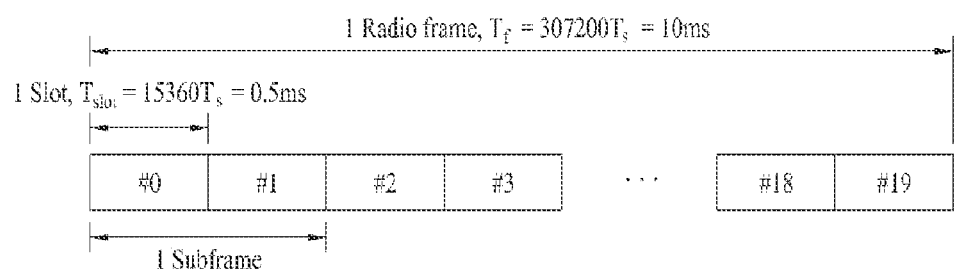
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$), $T_s$ denotes a sampling time, and is represented by $T_s = 1/(15 \text{ kHz} \times 2048) = 3.2552 \times 10^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
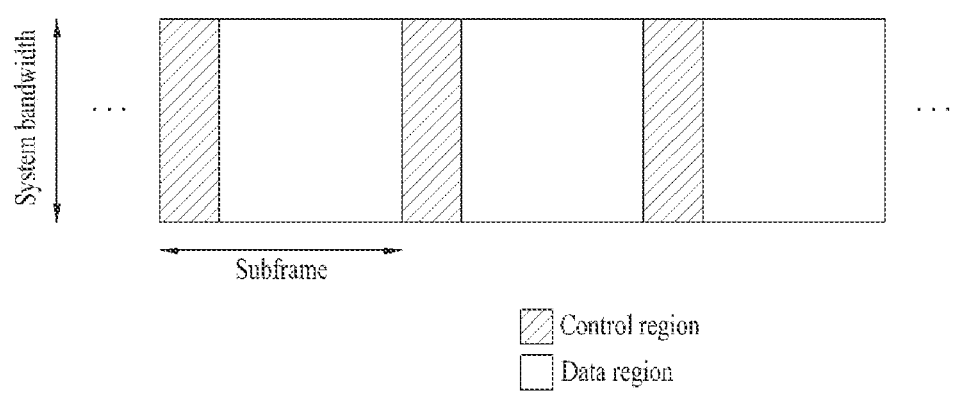
FIG. 5 is a diagram showing the functional structure of a downlink radio frame in an LTE system.

FIG. 5 is a diagram showing the functional structure of a downlink radio frame in an LTE system.

Referring to FIG. 5, the downlink radio frame includes 10 subframes having the same length. In the 3GPP LTE system, a subframe is defined as a basic time unit of packet scheduling in an entire downlink frequency. Each subframe is divided into a region (control region) for transmitting scheduling information and other control channels and a region (data region) for transmitting downlink data. The control region starts from a first OFDM symbol of a subframe and includes one or more OFDM symbols. The size of the control region may be independently set according to subframe. The control region is used to transmit an L1/L2 (layer 1/layer 2). The data region is used to transmit downlink traffic.

Figure 6:
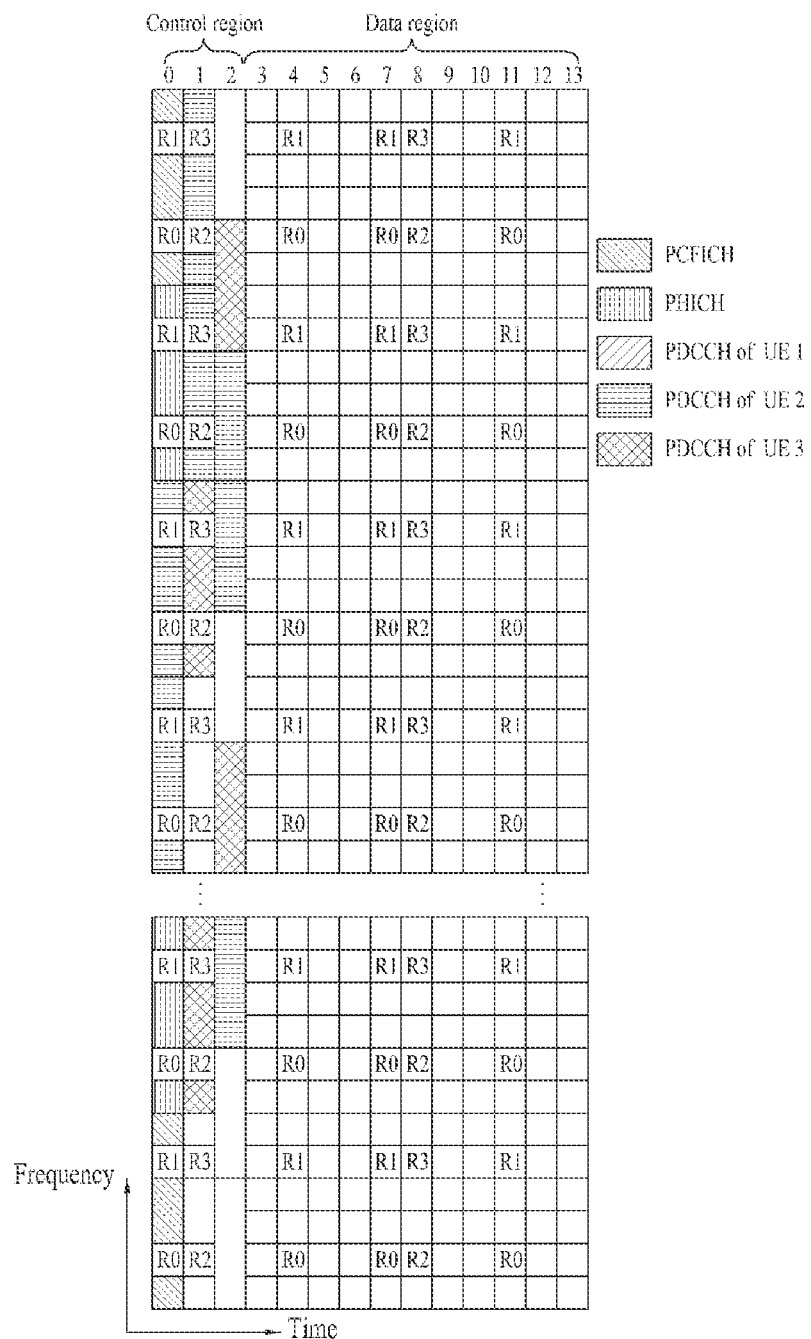
FIG. 6 is a diagram showing a control channel included in a control region of a subframe in an LTE system.

FIG. 6 is a diagram showing a control channel included in a control region of a subframe in an LTE system.

Referring to FIG. 6, the subframe includes 14 OFDM symbols. The first to third OFDM symbols are used as a control region and the remaining 13 to 11 OFDM symbols are used as a data region, according to subframe configuration.

Figure 7:
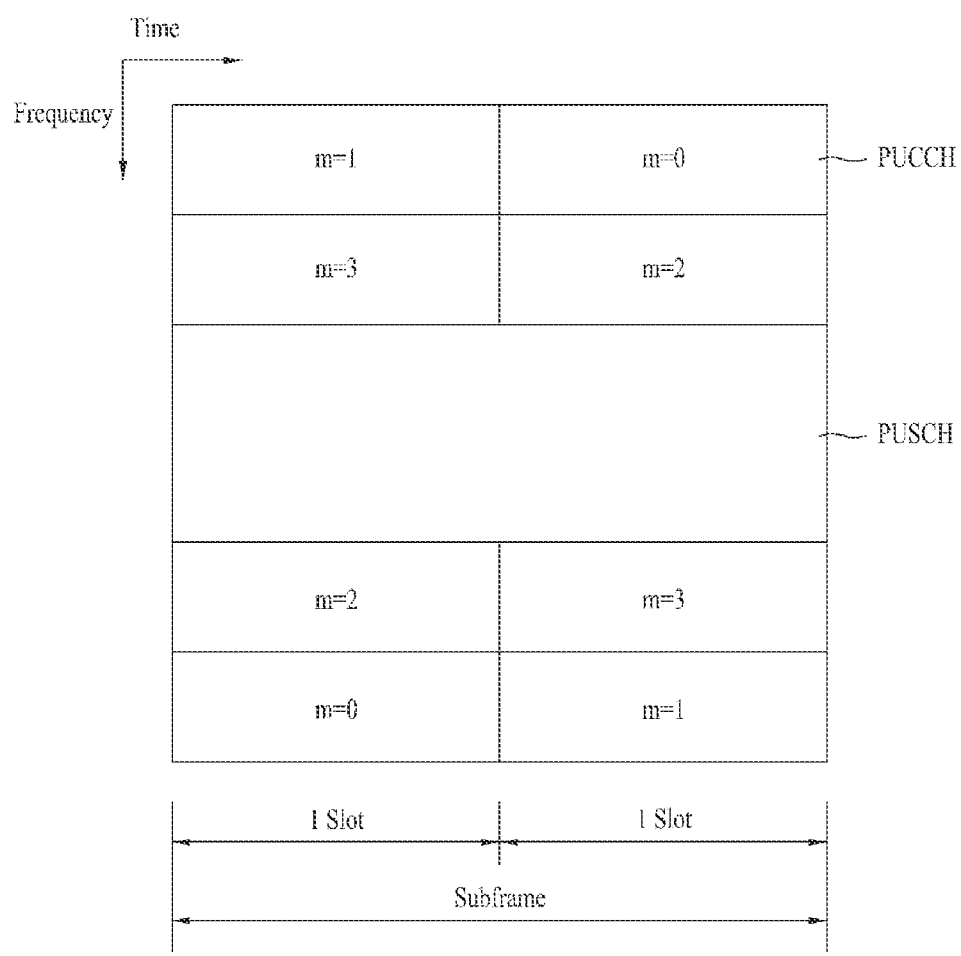
FIG. 7 is a diagram showing the structure of an uplink subframe used in an LTE system.

In FIG. 7, R1 to R4 denote reference signals (RS) for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell ID. One REG includes four resource elements (REs). The PCFICH has a value of 1 to 3 and is modulated using a Quadrature Phase Shift Keying (QPSK) scheme.

The Physical Hybrid-ARQ Indicator Channel (PHICH) is used to transmit HARQ ACK/NACK for uplink transmission. The PHICH includes three REGs and is scrambled on a cell-specific basis. ACK/NACK is indicated by one bit, is spread with a spreading factor (SF) of 2 or 4, and is repeated three times. A plurality of PHICHs may be mapped to the same resources. The PHICH is modulated by binary phase shift keying (BPSK).

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs), which will be described in greater detail below. The PDCCH informs each UE or a UE group of information associated with resource allocation of a Paging Channel (PCH) and a Downlink-Shared Channel (DL-SCH), both of which are transport channels, uplink scheduling grant, HARQ information, etc.

The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

FIG. 7 is a diagram showing the structure of an uplink subframe used in an LTE system.

Referring to FIG. 7, an uplink subframe includes a plurality (e.g., two) of slots. The number of SC-FDMA symbols included in the slot may be changed according to CP length. For example, the slot may include seven SC-FDMA symbols in a normal CP case. An uplink subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on a frequency axis and is "frequency-hopped" at a slot edge. The control information includes ACK/NACK, CQI, PMI, RI, etc.

Figure 8:
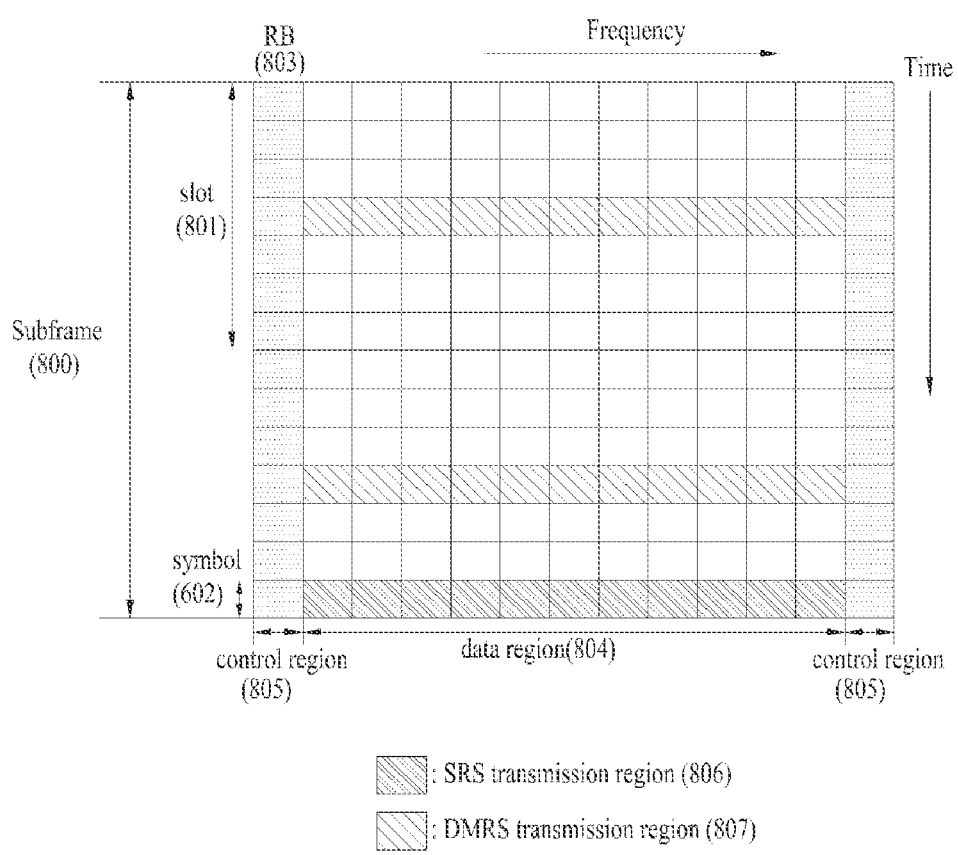
FIG. 8 is another diagram showing the structure of an uplink subframe in an LTE system.

FIG. 8 is another diagram showing the structure of an uplink subframe in an LTE system.

Referring to FIG. 8, a subframe 800 having a length of 1 ms, which is a basic unit of LTE uplink transmission, includes two slots 801 each having a length of 0.5 ms. In case of normal cyclic prefix (CP), each slot includes seven symbols 802 and one symbol corresponds to one SC-FDMA symbol. An RB 803 is a resource allocation unit corresponding to 12 subcarriers in a frequency domain and one slot in a time domain. The structure of the uplink subframe of LTE is roughly divided into a data region 804 and a control region 805. The data region refers to a series of communication resources used to transmit data such as voice or packets to each UE and corresponds to resources excluding resources belonging to the control region in a subframe. The control region refers to a series of communication resources used to transmit a downlink channel quality report from each UE, reception ACK/NACK for a downlink signal, an uplink scheduling request, etc.

As shown in FIG. 8, a region 806 for transmitting a sounding reference signal (SRS) within one subframe is a part including SC-FDMA symbols located at the last of a time axis in one subframe and the SRS is transmitted via a data transmission band on a frequency axis. SRSs of several UEs transmitted using the last SC-FDMA symbols of the same subframe may be distinguished according to frequency location.

The SRS is composed of constant amplitude zero auto correlation (CAZAC) sequences. SRSs transmitted from several UEs are CAZAC sequences $r^{SRS}(n) = r_{u,v}^{(\alpha)}(n)$ having different cyclic shift values $\alpha$ according to Equation 1.

$$\alpha = 2\pi \frac{n_{SRS}^{cs}}{8} \qquad \text{Equation 1}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have a zero correlation value with sequences having different cyclic shift values. Using such property, SRSs of the same frequency domain may be divided according to CAZAC sequence cyclic shift values. The SRS of each UE is allocated to the frequency according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 2.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{Equation 2}$$

where, $k_0$ denotes a frequency domain start point of an SRS and is defined by Equation 3.

$$k_0 = k_0' + \sum_{b=0}^{B_{SRS}} 2M_{sc,b}^{RS} n_b \qquad \text{Equation 3}$$

where, $n_b$ denotes a frequency location index. $k_0'$ for a general uplink subframe is defined by Equation 4 and $k_0'$ for an uplink pilot time UpPTS is defined by Equation 5.

$$k_0' = (\lfloor N_{RB}^{UL}/2 \rfloor - m_{SRS,0}/2) N_{SC}^{RB} + k_{TC} \qquad \text{Equation 4}$$

$$k_0' = \qquad \text{Equation 5}$$
$$\begin{cases} (N_{RB}^{UL} - m_{SRS,0}^{max}) N_{sc}^{RB} + k_{TC} & \text{if } \frac{((n_f \bmod 2) \times}{(2 - N_{SP}) + n_{hf})} \bmod 2 = 0 \\ k_{TC} & \text{otherwise} \end{cases}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 in an uplink pilot slot of a second half frame. $M_{sc,b}^{RS}$ is the length of the SRS sequence expressed in subcarrier units defined by Equation 6, that is, a bandwidth.

$$M_{sc,b}^{RS} = m_{SRS,b} N_{sc}^{RB}/2 \qquad \text{Equation 6}$$

In Equation 6, $m_{SRS,b}$ is a value signaled from an eNB according to an uplink bandwidth $N_{RB}^{UL}$ as shown in Tables 1 to 4.

In order to acquire $m_{SRS,b}$, a cell-specific parameter $C_{SRS}$ having an integer value of 0 to 7 and a UE-specific parameter $B_{SRS}$ having an integer value of 0 to 3 are necessary. The values of $C_{SRS}$ and $B_{SRS}$ are provided by a higher layer.

TABLE 1

$b_{hop} = 0, 1, 2, 3$ and $6 \leq N_{RB}^{UL} \leq 40$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

$b_{hop} = 0, 1, 2, 3$ and $40 < N_{RB}^{UL} \leq 60$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

$b_{hop} = 0, 1, 2, 3$ and $60 < N_{RB}^{UL} \leq 80$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

$b_{hop} = 0, 1, 2, 3$ and $80 < N_{RB}^{UL} \leq 110$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |

TABLE 4-continued $b_{hop} = 0, 1, 2, 3$ and $80 < N_{RB}^{UL} \leq 110$

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

As described above, the UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is deactivated, that is if $b_{hop} \geq B_{SRS}$, a frequency location index $n_b$ has a constant value as shown in Equation 7. Here, $n_{RRC}$ is a parameter received from a higher layer.

$$n_b = \lfloor 4n_{RRC}/m_{SRS,b} \rfloor \bmod N_b \quad \text{Equation 7}$$

Meanwhile, if frequency hopping of the SRS is activated, that is, $b_{hop} < B_{SRS}$, a frequency location index $n_b$ is defined by Equations 8 and 9.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{Equation 8}$$

$$F_b(n_{SRS}) = \begin{cases} (N_b/2) \left\lfloor \frac{n_{SRS} \bmod \Pi_{b'=b_{hop}}^{b} N_{b'}}{\Pi_{b'=b_{hop}}^{b-1} N_{b'}} \right\rfloor + \\ \qquad \left\lfloor \frac{n_{SRS} \bmod \Pi_{b'=b_{hop}}^{b} N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases} \quad \text{Equation 9}$$

where, $n_{SRS}$ is a parameter used to calculate the number of times of transmission of the SRS and is defined by Equation 10.

$$n_{SRS} = \begin{cases} 2N_{SP}n_f + 2(N_{SP}-1)\lfloor \frac{n_s}{10} \rfloor + \\ \qquad \lfloor \frac{T_{offset}}{T_{offset\_max}} \rfloor, & \text{for 2 ms } SRS \text{ periodicity of TDD frame structure} \\ \lfloor (n_f \times 10 + \lfloor n_s/2 \rfloor)/T_{SRS} \rfloor, & \text{otherwise} \end{cases} \quad \text{Equation 10}$$

In Equation 10, $T_{SRS}$ denotes the periodicity of an SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Tables 5 and 6 according to FDD and TDD. In particular, Table 5 shows the SRS configuration index for FDD and Table 6 shows the SRS configuration index for TDD.

TABLE 5

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Figure 9:
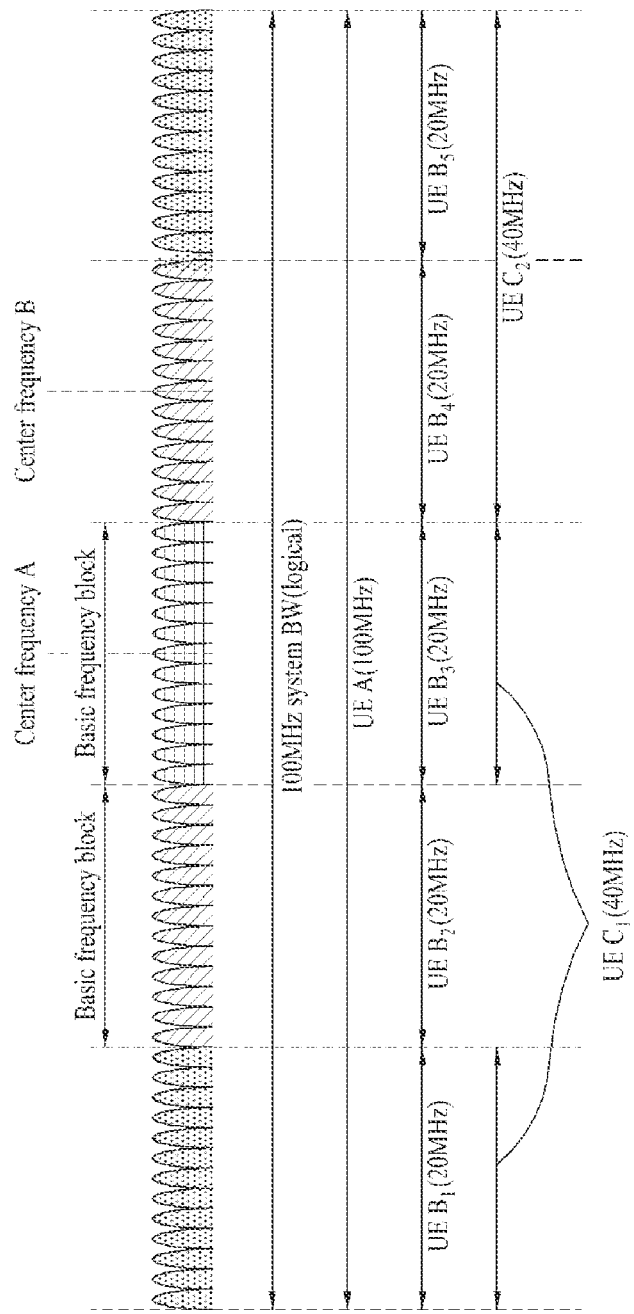
FIG. 9 is a conceptual diagram illustrating carrier aggregation.

FIG. 9 is a conceptual diagram illustrating carrier aggregation. Carrier aggregation refers to a method of using a plurality of component carriers as a large logical frequency band in order to use a wider frequency band in a radio communication system.

Referring to FIG. 9, an entire system band (BW) is a logical band having a maximum bandwidth of 100 MHz. The entire system band includes five component carriers (CCs) and each CC has a maximum bandwidth of 20 MHz. The CC includes one or more physically contiguous subcarriers. Although all CCs have the same bandwidth in FIG. 9, this is only exemplary and the CCs may have different bandwidths. Although the CCs are shown as being contiguous in the frequency domain in FIG. 9, FIG. 9 merely shows the logical concept and thus the CCs may be physically contiguous or separated.

Different center frequencies may be used fir the CCs or one common center frequency may be used for physically contiguous CCs. For example, in FIG. 9, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system, By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system hand is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or discontiguous. The UE $C_1$ uses two discontiguous CCs and the UE $C_2$ uses two contiguous CCs.

While one downlink component carrier and one uplink component carrier are used in an LTE system, several component carriers may be used in an LTE-A system as shown in FIG. 8. At this time, a method of scheduling a data channel by a control channel may be divided into a linked carrier scheduling scheme and a cross carrier scheduling scheme. More specifically, in the linked carrier scheduling scheme, a control channel transmitted via a specific CC schedules only a data channel via the specific CC, similarly to the existing LTE system using a single CC. In the cross carrier scheduling scheme, a control channel transmitted via a primary CC using a carrier indicator field (CIF) schedules a data channel transmitted via the primary CC or another CC.

Hereinafter, an uplink transmission power control (TPC) command of a UE in an LTE system will be described. The TPC command is signaled as an offset value transmitted from an eNodeB via a PDCCH and uplink transmission power of the UE is dynamically controlled by the offset value. The UE needs to check the TPC in every subframe unless discontinuous reception (DRX) is set. As one method of transmitting the TPC command to the UE, the TPC command is included in an uplink or downlink grant message (that is, DCI formats 0, 1, 1A, 1B, 1C, 1D, 2 and 2A) for the UE. The TPC command included in the uplink grant message controls the transmit power of a PUSCH and the TPC command included in the downlink grant message controls the transmit power of a PUCCH.

In addition, a method of signaling an aggregation of TPC commands of a plurality of UEs may be taken into account and is supported by an LTE system via DCI formats 3 and 3A.

FIG. 10 is a diagram showing the structure of DCI formats 3 and 3A in an LTE system. If a UE supports DCI formats 3 and 3A, the UE decodes control information using one of DCI formats 3 and 3A through higher layer signaling and reads transmit power intimation thereof.

Referring to FIG. 10, DCI format 3 includes transmit power information having a size of 2 bits with respect to each UE and DCI format 3A includes transmit power information of 1 bit. Since DCI formats 3 and 3A have the same payload size, if the size of DCI format 3 is an odd bit, a padding bit 0 may be inserted in the end thereof. The payload size of DCI formats 3 and 3A are equal to those of DCI format 0 and 1A, and thus the number of times of blind decoding may be reduced.

Hereinafter, a dynamic activation/deactivation scheme of a downlink component carrier according to an embodiment of the present invention will be described.

As described above, in an LTE-A system, one UE may use multiple component carriers. A UE is informed of the multiple component carriers using an RRC configuration signal which is a higher layer signal and the UE may receive downlink data using the multiple component carriers or transmit uplink data via the multiple of component carriers. However, if a data traffic property of the UE is not stable, all component carriers signaled from the higher layer may not be efficiently used.

Accordingly, recently, a method of dynamically activating/deactivating a downlink component carrier set in order to efficiently use component carriers and prevent unnecessary power consumption due to buffering has been proposed. As such an activation method, a method of activating/deactivating each component carrier or a method of simultaneously activating/deactivating all downlink component carriers except for a specific component carrier (e.g., a downlink anchor component carrier) may be taken into account.

Figure 11:
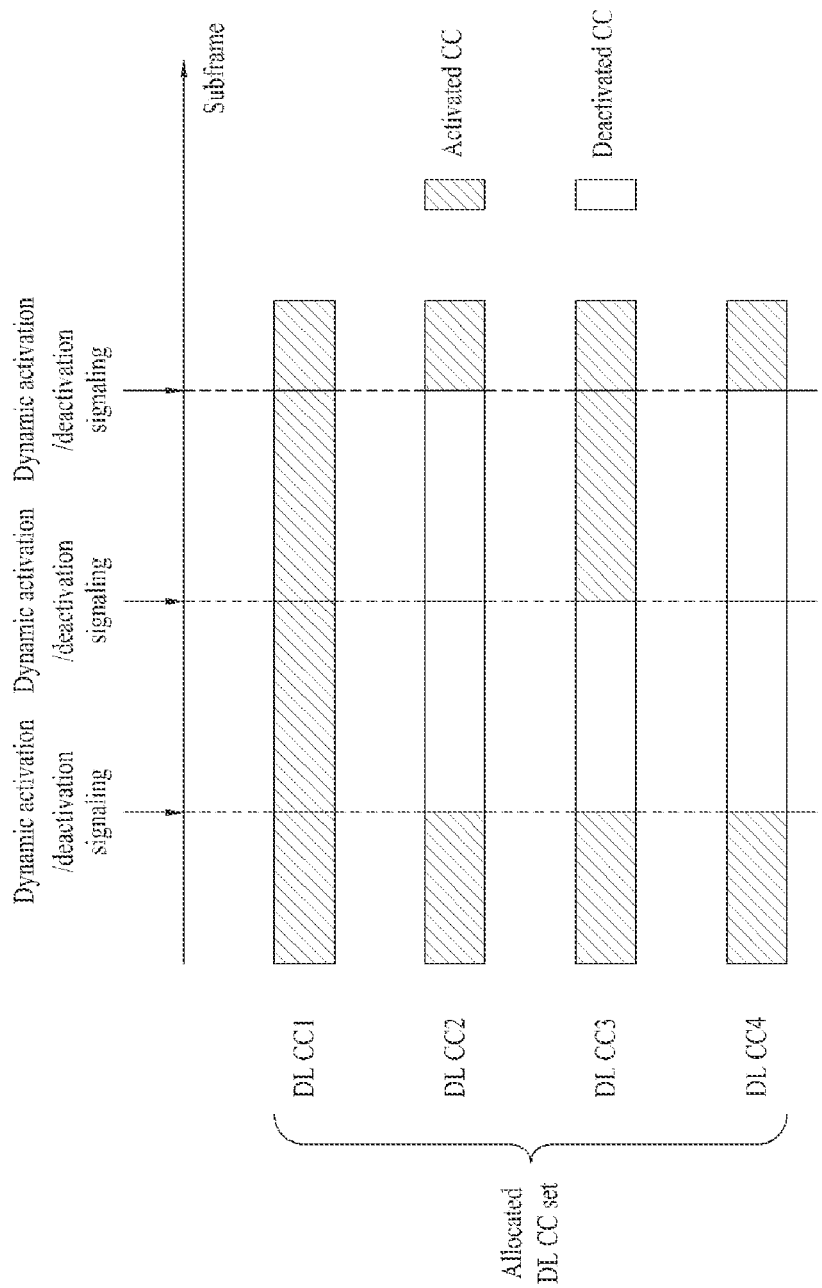
FIG. 11 is a diagram illustrating a method of scheduling activation/deactivation of a downlink component carrier according to an embodiment of the present invention.

FIG. 11 is a diagram illustrating a method of scheduling activation/deactivation of a downlink component carrier according to an embodiment of the present invention.

Referring to FIG. 11, decrease or increase in the number of downlink component carriers received using an activation/deactivation signal which is dynamic signaling in a state in which a UE sets a total of four downlink component carriers as downlink component carriers allocated thereto may be taken into account. Such a dynamic activation/deactivation signal may be transmitted via a physical layer control signal (PDCCH) or a MAC layer signal (PDSCH).

In the above-described dynamic activation/deactivation method of the downlink component carrier, it is possible to reduce power consumption of a UE by dynamically controlling downlink component carriers received at the UE whenever necessary.

Hereinafter, a dynamic activation/deactivation method of a sounding reference signal according to an embodiment of the present invention will be described.

In an LTE-A system, various schemes such as an uplink MIMO transmission of a UE using a plurality of antennas, a Coordinated Multi-Point (CoMP) scheme for transmitting and receiving a signal cooperatively with a plurality of eNodeBs, a network in which heterogeneous networks are combined, and an uplink discontinuous data allocation (cluster) scheme have been developed. Accordingly, in order to support such schemes, transmission of a sounding reference signal for uplink channel measurement needs to be improved and a method of dynamically activating/deactivating sounding reference signal transmission may be taken into account as a method of improving a sounding reference signal transmission scheme.

That is, the method of dynamically activating/deactivating the sounding reference signal refers to a method of receiving information about a transmission period, an offset, etc. of a sounding reference signal to prepare sounding reference signal transmission and activating/deactivating actual sounding reference signal transmission using a signal (e.g., a PDCCH which is a physical layer control signal or an MAC layer signal) faster than a higher layer signal.

At this time, a method of activating/deactivating sounding reference signal transmission on a per uplink component carrier basis may be taken into account and a method of simultaneously activating/deactivating sounding reference signal transmission of all uplink component carriers except for a specific component carrier (e.g., an uplink anchor component carrier) may be taken into account.

Figure 12:
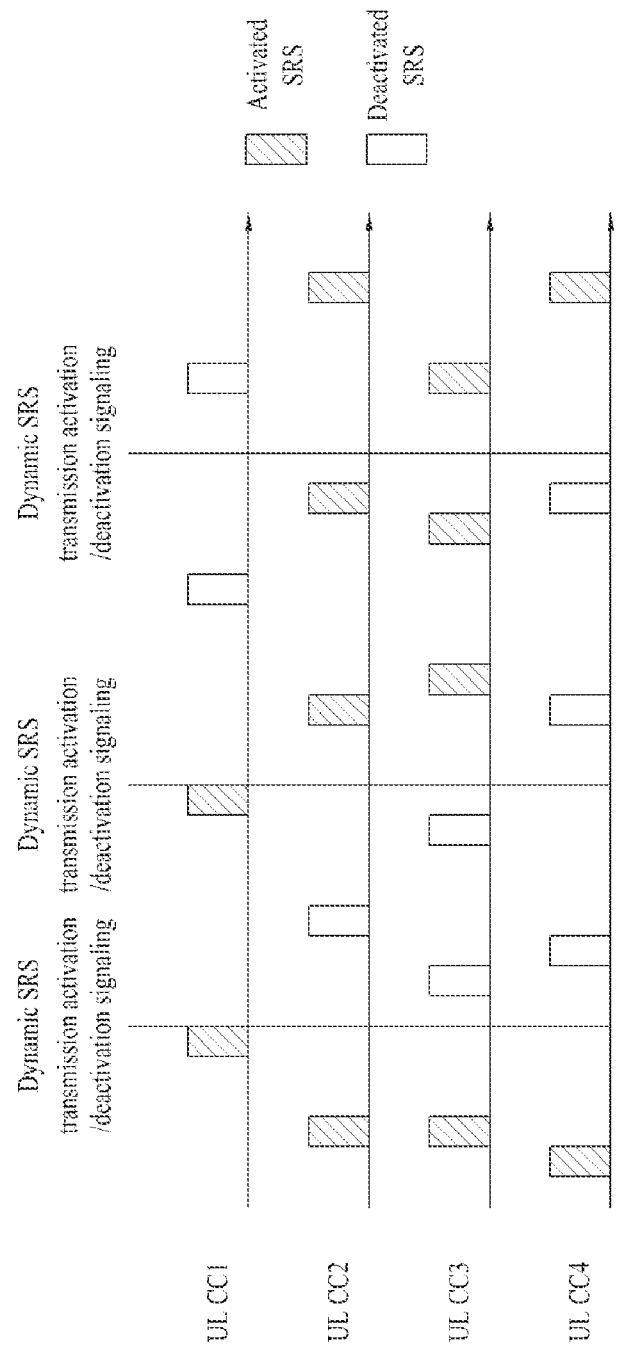
FIG. 12 is a diagram illustrating a method of scheduling activation/deactivation of sounding reference signal transmission of an uplink component carrier according to an embodiment of the present invention.

FIG. 12 is a diagram illustrating a method of scheduling activation/deactivation of sounding reference signal transmission of an uplink component carrier according to an embodiment of the present invention.

Referring to FIG. 12, sounding reference signal transmission of all uplink component carriers except for a first uplink component is deactivated when a first dynamic sounding reference signal transmission activation/deactivation signal is applied while a sounding reference signal is transmitted using four uplink component carriers, sounding reference signal transmission is deactivated in first and fourth uplink component carriers when a second dynamic sounding reference signal transmission activation/deactivation signal is applied, and sounding reference signal transmission is activated in second and third uplink component carriers.

Similarly, sounding reference signal transmission in the first uplink component carrier is deactivated after a third dynamic sounding reference signal transmission activation/deactivation signal is applied, and sounding reference signal transmission is activated in the remaining uplink component carriers.

The method of dynamically signaling activation/deactivation of sounding reference signal transmission in each uplink component carrier may be introduced in order to perform Time Division Multiplexing (TDM) with respect to insufficient sounding reference signal transmission resources between different UEs or to reduce UE power used to transmit an unnecessary sounding reference signal.

However, the method of dynamically signaling activation/deactivation of sounding reference signal transmission may be extended and used as a method of controlling an uplink component carrier set used to transmit uplink data. That is, while sounding reference signal transmission of a specific uplink component carrier is deactivated, it is difficult to perform channel estimation of an uplink component carrier at an eNodeB and to send uplink transmission grant using the uplink component carrier.

Accordingly, since the activation/deactivation signal of sounding reference signal transmission is similar to the dynamic activation/deactivation signal of the downlink component carrier in terms of use, the present invention proposes a method of simultaneously transmitting the activation/deactivation signal of the downlink component carrier and the activation/deactivation signal of sounding reference signal transmission via one signal as follows.

First, there is a method of using a UE-specific PDCCH or a PDSCH which is an MAC layer signal. This is a method of sending two kinds of activation/deactivation signals to UEs using a UE-specific PDCCH or a PDSCH which is an MAC layer signal. In this case, a method of simultaneously transmitting an activation/deactivation signal (e.g., bitmap information per downlink component carrier) of each downlink component carrier for all downlink component carriers and a sounding reference signal transmission activation/deactivation signal per uplink component carrier (e.g., bitmap information per uplink component carrier) or simultaneously transmitting two kinds of signals (an activation/deactivation signal of a downlink component carrier or a sounding reference signal transmission activation/deactivation signal of an uplink component carrier) for commonly activating/deactivating the remaining component carriers except for a specific component carrier (that is, an anchor component carrier) may be taken into account. In addition, a method of simultaneously sending signals for commonly activating/deactivating a predetermined number of grouped components carriers may be taken into account.

There is a method of using a PDCCH for a UE group, similarly to DCI formats 3 and 3A used to control the transmit power of a specific UE group in an LTE system, which will be described in greater detail with reference to the drawings.

Figure 13:
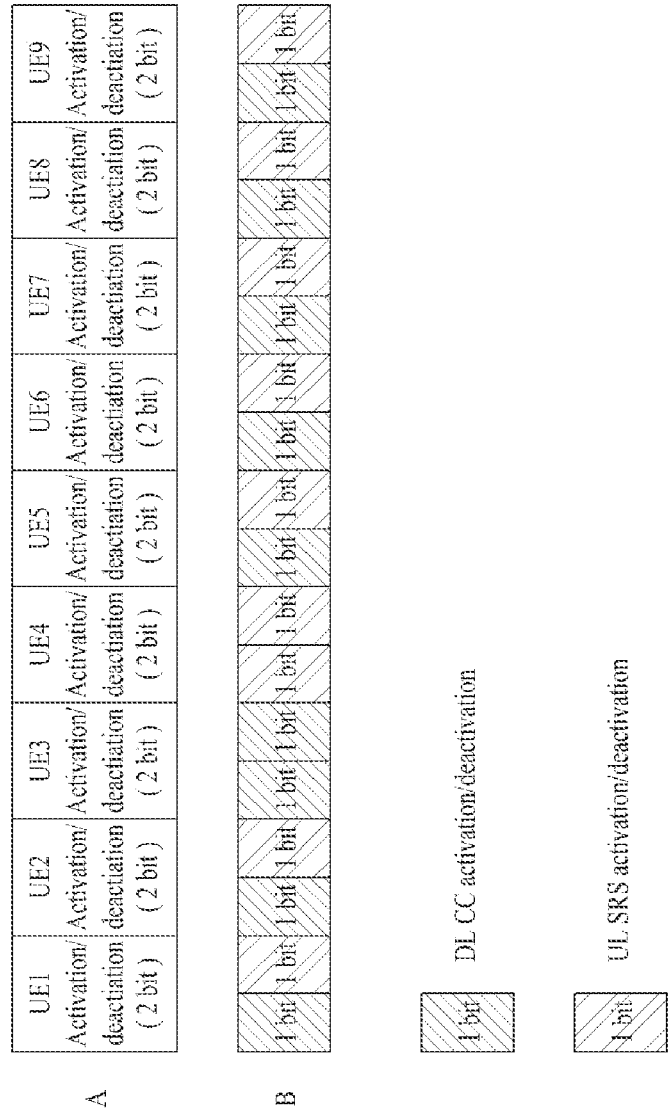
FIG. 13 is a diagram illustrating a method of simultaneously scheduling activation/deactivation of a downlink component carrier and activation/deactivation of sounding reference signal transmission of an uplink component carrier according to an embodiment of the present invention.

FIG. 13 is a diagram illustrating a method of simultaneously scheduling activation/deactivation of a downlink component carrier and activation/deactivation of sounding reference signal transmission of an uplink component carrier according to an embodiment of the present invention.

If each UE controls activation/deactivation of a downlink component carrier and activation/deactivation of sounding reference signal transmission of an uplink component carrier using a signal having a size of 1 bit for commonly activating/deactivating CCs except for a specific CC, a DCI format similar to DCI formats 3 and 3A may be designed as shown in FIG. 13. More specifically, as shown in FIG. 13A, a method of allocating two continuous bits (DL CC activation/deactivation and UL SRS activation/deactivation) in DCI format 3 to each UE and informing the UE of the location of information to be read using a TPC index (higher layer signaling) may be taken into account. Similarly to DCI format 3A, a method of individually signaling 1 bit without continuously arranging signals of 2 bits as shown in FIG. 13B may be taken into account.

In addition, if an activation/deactivation signal is sent on a per component carrier or component carrier group basis, a method of freely allocating an activation/deactivation signal per component carrier or component carrier group to a specific bit and signaling an index thereof through higher layer signaling as shown in FIG. 13B may be taken into account.

In addition, a method of changing RNTI masking in order to distinguish between component carriers or component carrier groups may be taken into account. In this case, a method of combining an index of a specific bit and RNTI and simultaneously transmitting activation/deactivation signals in component carrier units or component carrier group units may be taken into account.

Hereinafter, a PUSCH extension method in a subframe, in which a sounding reference signal is not transmitted, according to an embodiment of the present invention will be described.

In an LTE system, if all UEs perform PUSCH transmission in a subframe in which a sounding reference signal is transmitted, data may be set not to be transmitted in a last SC-FDMA symbol. That is, since the last symbol is used to transmit a sounding reference signal, all UEs may not use the last SC-FDMA symbol in a subframe in which a sounding reference signal is transmitted, that is, uplink data (PUSCH) may be set to be transmitted using only 11 SC-FDMA symbols, in order to prevent interference between a sounding reference signal symbol and an uplink data symbol of a UE.

However, since sounding reference signal symbols may not be used over an overall bandwidth, a method of performing PUSCH transmission in a state in which a last SC-FDMA symbol is always empty may cause inefficient resource use. Accordingly, information indicating whether PUSCH transmission is performed even using the last SC-FDMA symbol is transmitted in uplink grant indicating PUSCH transmission such that resources are efficiently used in a subframe in which a sounding reference signal is transmitted. That is, if an actual sounding reference signal is not transmitted in a bandwidth allocated for transmitting a PUSCH in a specific subframe in which a sounding reference signal may be transmitted, the PUSCH may be transmitted even using the last SC-FDMA symbols by providing PUSCH extension information in uplink grant.

Further, the case of performing dynamic scheduling so as to transmit an aperiodic sounding reference signal to a specific UE using specific frequency resources in a subframe in which a sounding reference signal is not transmitted may be taken into account. Even in this case, as in an LTF system, if uplink data (PUSCH) is transmitted without using a last SC-FDMA symbol, the last SC-FDMA symbol may not be efficiently used. Accordingly, PUSCH extension information is transmitted in uplink grant and thus an operation in which a dynamically triggered aperiodic sounding reference signal and a PUSCH do not collide with each other is possible even in a subframe in which a sounding reference signal is not transmitted.

In addition, the case of allocating a plurality of uplink component carriers to the UE and signaling only sounding reference signal transmission in an entire frequency band or some frequency bands of a specific uplink component carrier may be taken into account. Even in this case, if uplink data (PUSCH) is transmitted without using a last SC-FDMA symbol, the last SC-FDMA symbol of every uplink component carrier may not be efficiently used. Similarly, PUSCH extension information of an uplink component carrier in which a sounding reference signal is not transmitted is transmitted in uplink grant and uplink data is transmitted using a last SC-FDMA symbol in a subframe in which a sounding reference signal is not transmitted, thereby efficiently using resources.

In addition, a multi-cell cooperative system, for example, in a system in which a femto cell is located in a macro cell and a first UE communicates with both the macro cell and the femto cell, the above-described scheme may be used even upon sounding reference signal transmission of a second UE and PUSCH transmission of a first UE. Here, it is assumed that the PUSCH is transmitted even in the last symbol. That is, since the PUSCH transmitted by the first UE may cause interference in reception of a sounding reference signal in the macro cell, a last symbol may not be allocated to the PUSCH transmitted by the first UE.

As a method of transmitting PUSCH extension information in uplink grant, a method of explicitly adding 1-bit information to uplink grant may be taken into account or a method of implicitly using CRC masking or a scrambling sequence may be taken into account. In addition, a signaling method using a specific state combination of bits used in uplink grant may also be taken into account.

Figure 14:
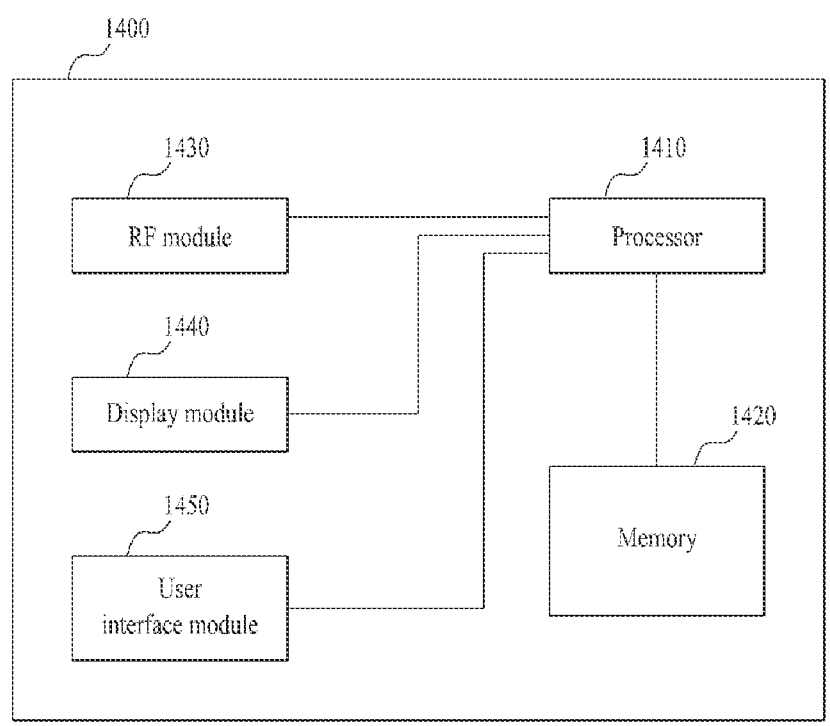
FIG. 14 is a block diagram showing a communication apparatus according to an embodiment of the present invention.

FIG. 14 is a block diagram showing a communication apparatus according to an embodiment of the present invention.

Referring to FIG. 14, a communication apparatus 1400 includes a processor 1410, a memory 1420, a Radio Frequency (RF) module 1430, a display module 1440 and a user interface module 1450.

The communication apparatus 1400 is shown for convenience of description and some modules thereof may be omitted. In addition, the communication apparatus 1400 may further include necessary modules. In addition, some modules of the communication apparatus 1400 may be subdivided. The processor 1410 is configured to perform an operation of the embodiment of the present invention described with reference to the drawings.

More specifically, if the communication apparatus 1400 is included in the eNB, the processor 1410 serve to generate and map a control signal to a control channel set in a plurality of frequency blocks. If the communication apparatus 1400 is included in the UE, the processor 1410 may check a control channel allocated thereto from a signal received from a plurality of frequency blocks and extract a control signal therefrom.

Thereafter, the processor 1410 may perform a necessary operation based on the control signal. For a detailed description of the processor 1410, reference may be made to the description associated with FIGS. 1 to 13.

The memory 1420 is connected to the processor 1410 so as to store an operating system, an application, program code, data and the like. The RF module 1430 is connected to the processor 1410 so as to perform a function for converting a baseband signal into a radio signal or converting a radio signal into a baseband signal. The RF module 1430 performs analog conversion, amplification, filtering and frequency up-conversion or inverse processes thereof. The display module 1440 is connected to the processor 1410 so as to display a variety of information. As the display module 1440, although not limited thereto, a well-known device such as a Liquid Crystal Display (LCD), a Light Emitting Diode (LED), or an Organic Light Emitting Diode (OLED) may be used. The user interface module 1450 is connected to the processor 1410 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and an RN. Specific operations to be conducted by the base station in the present invention may also be conducted by an upper node of the base station as necessary, in other words, it will be obvious to those skilled in the art that various operations for enabling the base station to communicate with the UE in a network composed of several network nodes including the base station will be conducted by the base station or other network nodes other than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention is applicable to a wireless communication system. More particularly, the present invention is applicable to a method and apparatus for transmitting an uplink signal at a user equipment (UE) in a wireless communication system.

What is claimed is:

1. A method of transmitting a sounding reference signal (SRS) by a user equipment in a wireless communication system, the method comprising:
   receiving, from a base station, a physical downlink control channel (PDCCH) including a carrier indicator field (CIF) and an SRS field via a first component carrier (CC) among a plurality of CCs including the first CC and one or more second CCs, the CIF indicating a specific CC of the one or more second CCs and the SRS field indicating whether the user equipment has to transmit the SRS via the specific CC indicated by the CIF;
   transmitting, to the base station, the SRS on an uplink subframe via the specific CC indicated by the CIF based on SRS configuration information when the SRS field is enabled; and
   receiving, from the base station, a first medium access control (MAC) information for deactivating the one or more second CCs other than the first CC, the first MAC information including a bitmap for indicating whether the one or more second CCs are to be deactivated,
   wherein when a bit for the specific CC in the bitmap has been disabled, the specific CC and SRS transmission on the specific CC are deactivated.

2. The method of claim 1, further comprising:
   receiving, from the base station, a radio resource control (RRC) message including the SRS configuration information for the user equipment.

3. The method of claim 1, wherein the SRS configuration information includes at least one of:
   an SRS bandwidth parameter indicating a SRS transmission bandwidth,
   an SRS configuration index parameter indicating a periodicity and a subframe offset,
   a cyclic shift parameter used for performing cyclic shift of the SRS, and
   a transmission comb parameter indicating a transmission comb offset.

4. The method of claim 1, further comprising:
   receiving, from the base station, a radio resource control (RRC) message for configuring the one or more second CCs in addition to the first CC; and
   receiving, from the base station, a second MAC information for activating the one or more second CCs other than the first CC.

5. The method of claim 1, wherein the SRS is an aperiodic type and the SRS field of the PDCCH triggers the aperiodic type of SRS transmission.

6. The method of claim 1, wherein the SRS is generated and mapped on a last symbol of the uplink subframe.

7. The method of claim 1, wherein the first CC is always activated and the one or more second CCs are able to be deactivated for managing power consumption of the user equipment.

8. The method of claim 1, wherein the first MAC information is received via a physical downlink shared channel (PDSCH).

9. A non-transitory computer readable medium on which a program for executing the method of claim 1 is recorded.

10. A user equipment for transmitting a sounding reference signal (SRS) in a wireless communication system, the user equipment comprising:
    a receiver configured to receive, from a base station, a physical downlink control channel (PDCCH) including a carrier indicator field (CIF) and an SRS field via a first component carrier (CC) among a plurality of CCs including the first CC and one or more second CCs, the CIF indicating a specific CC of the one or more second CCs and the SRS field indicating whether the user equipment has to transmit the SRS via the specific CC indicated by the CIF;
    a transmitter configured to transmit, to the base station, the SRS on an uplink subframe via the specific CC indicated by the CIF based on SRS configuration information when the SRS field is enabled; and
    a processor configured to control the transmitter and the receiver,
    wherein the receiver receives, from the base station, a first medium access control (MAC) information for deactivating the one or more second CCs other than the first CC, and the first MAC information includes a bitmap for indicating whether the one or more second CCs are to be deactivated, and
    wherein when a bit for the specific CC in the bitmap has been disabled, the specific CC and SRS transmission on the specific CC are deactivated.

11. The user equipment of claim 10, wherein the receiver receives, from the base station, a radio resource control (RRC) message including the SRS configuration information for the user equipment.

12. The user equipment of claim 10, wherein the SRS configuration information includes at least one of:
    an SRS bandwidth parameter indicating a SRS transmission bandwidth,
    an SRS configuration index parameter indicating a periodicity and a subframe offset,
    a cyclic shift parameter used for performing cyclic shift of the SRS, and
    a transmission comb parameter indicating a transmission comb offset.

13. The user equipment of claim 10, wherein the receiver receives, from the base station, a radio resource control (RRC) message for configuring the one or more second CCs in addition to the first CC and a second MAC information for activating the one or more second CCs other than the first CC.

14. The user equipment of claim 10, wherein the SRS is an aperiodic type and the SRS field of the PDCCH triggers the aperiodic type of SRS transmission.

15. The user equipment of claim 10, wherein the SRS is generated and mapped on a last symbol of the uplink subframe.

16. The user equipment of claim 10, wherein the first CC is always activated and the one or more second CCs are able to be deactivated for managing power consumption of the user equipment.

17. The user equipment of claim 10, wherein the first MAC information is received via a physical downlink shared channel (PDSCH).

* * * * *